United States Patent
Heidjann et al.

(10) Patent No.: US 6,843,046 B2
(45) Date of Patent: Jan. 18, 2005

(54) SUPPORT WHEEL ASSEMBLY FOR AN AGRICULTURAL IMPLEMENT ON AN AGRICULTURAL MACHINE

(75) Inventors: Franz Heidjann, Harsewinkel (DE); Bernd Holtmann, Sendenhorst (DE)

(73) Assignee: CLAAS Selbstfahrende Ertemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/184,342

(22) Filed: Jun. 27, 2002

(65) Prior Publication Data

US 2003/0019197 A1 Jan. 30, 2003

(30) Foreign Application Priority Data

Jun. 27, 2001 (DE) .......................................... 101 30 647

(51) Int. Cl.⁷ .............................................. A01D 67/00
(52) U.S. Cl. ........................................................ 56/208
(58) Field of Search ........................... 56/1, 14.7, 15.8, 56/17.2, 208, DIG. 3, DIG. 10

(56) References Cited

U.S. PATENT DOCUMENTS

| | | | | |
|---|---|---|---|---|
| 1,093,473 A | * | 4/1914 | Reeves ........................ 55/378 |
| 2,606,417 A | * | 8/1952 | Richey ........................ 56/10.7 |
| 2,727,347 A | * | 12/1955 | Fenster et al. ................... 56/1 |
| 2,788,988 A | * | 4/1957 | Happe ..................... 56/16.4 R |
| 3,349,549 A | * | 10/1967 | Van Der Lely .......... 56/10.2 R |
| 3,387,436 A | * | 6/1968 | Kasper ............................ 56/6 |
| 3,616,862 A | * | 11/1971 | Van Der Lely ............. 172/107 |
| 3,717,983 A | * | 2/1973 | Reitz et al. .................... 56/208 |
| 3,908,345 A | * | 9/1975 | Oni et al. ...................... 56/208 |
| 3,995,411 A | * | 12/1976 | Johnson ....................... 56/15.8 |
| 4,085,571 A | * | 4/1978 | Mortier et al. ................. 56/208 |
| 4,141,200 A | * | 2/1979 | Johnson .................... 56/10.2 E |
| 4,203,275 A | * | 5/1980 | Vermeer ...................... 56/15.8 |
| 4,206,582 A | * | 6/1980 | Molzahn et al. .............. 56/15.8 |
| 4,212,144 A | * | 7/1980 | Raineri ........................ 56/15.8 |
| 4,250,696 A | * | 2/1981 | Hash ........................... 56/14.7 |
| 4,257,732 A | * | 3/1981 | Staffanson ................... 414/703 |
| 4,473,993 A | * | 10/1984 | Jennings et al. .............. 56/208 |
| 4,768,525 A | * | 9/1988 | Tanis .......................... 460/106 |
| 4,845,931 A | | 7/1989 | Brunér et al. |
| 5,005,342 A | * | 4/1991 | Lundahl et al. ........... 56/10.2 R |
| 5,201,167 A | * | 4/1993 | Rowse ............................ 56/6 |
| 5,758,478 A | * | 6/1998 | Bando et al. ................. 56/15.2 |
| 6,282,875 B1 | * | 9/2001 | Holtkotte et al. ............. 56/228 |
| 6,415,873 B1 | * | 7/2002 | Hudgins ...................... 172/311 |

FOREIGN PATENT DOCUMENTS

| | | |
|---|---|---|
| DE | 1 108 972 | 6/1961 |
| DE | 199 18 551 | 10/2000 |

* cited by examiner

*Primary Examiner*—Thomas B. Will
*Assistant Examiner*—Alicia Torres
(74) *Attorney, Agent, or Firm*—Husch & Eppenberger, LLC; Robert C. Haldiman; David A. Chambers

(57) ABSTRACT

A support wheel for an agricultural implement includes a support frame connected with an agricultural harvesting machine and its receiving device; and at least one support wheel connected with the support frame. In a preferred embodiment, the support frame includes first and second supporting arms. The second supporting arm is oriented in a generally vertical direction and is variable in length. In one arrangement, the second support is a lifting cylinder or a telescopic arm and is provided with a damping element. In another arrangement, the support wheel assembly includes at least one steerable support wheel that is pivoted on a pivot shaft by a steering cylinder. A preferred embodiment includes first and second steerable support wheels connected by a coupling mechanism and pivoted about first and second pivot shafts by a common steering cylinder. In yet another advantageous embodiment, the common steering cylinder is operatively coordinated with a steered axle of the agricultural harvesting machine through a control unit.

16 Claims, 4 Drawing Sheets

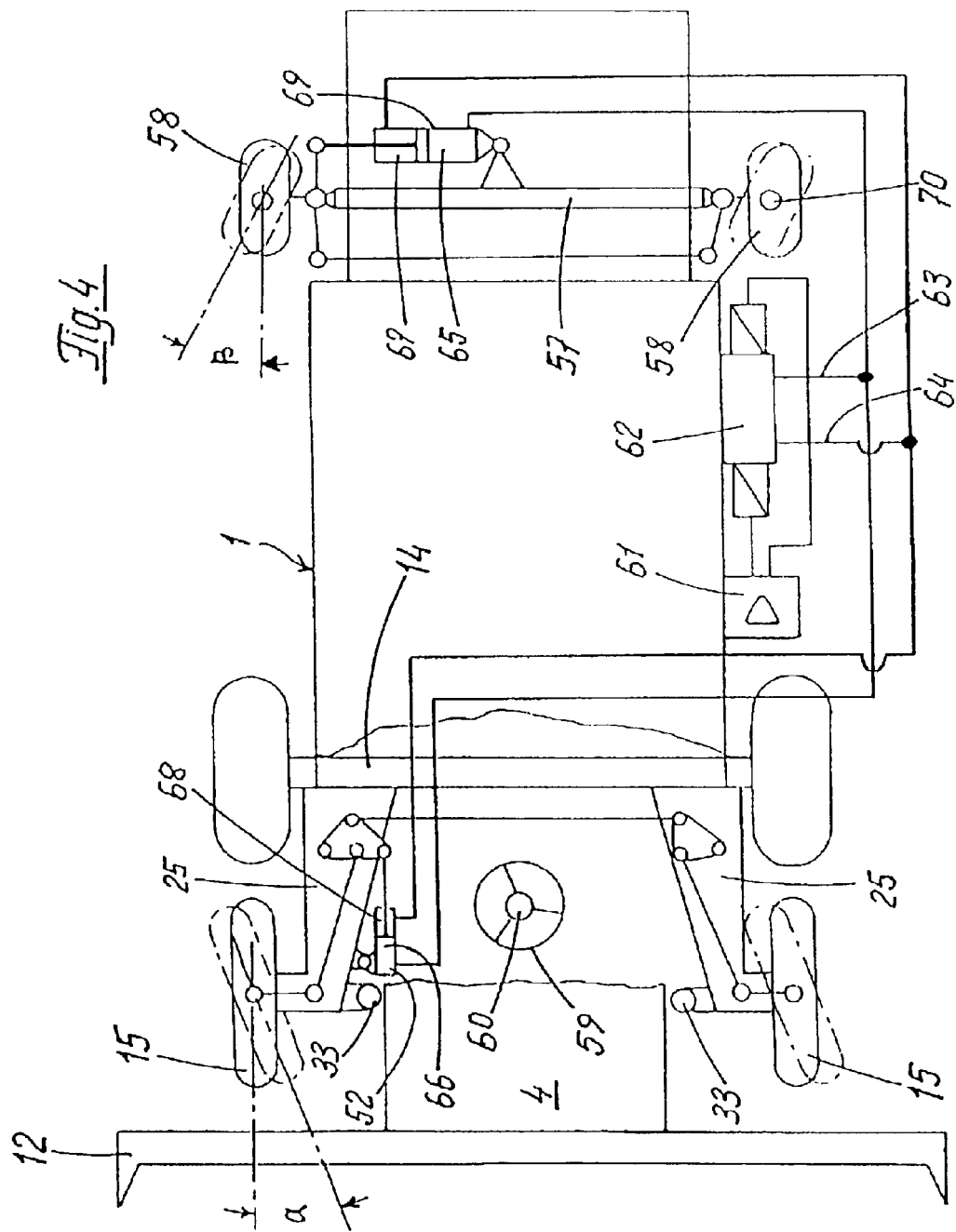

SUPPORT WHEEL ASSEMBLY FOR AN AGRICULTURAL IMPLEMENT ON AN AGRICULTURAL MACHINE

TECHNICAL FIELD OF THE INVENTION

The present invention relates generally to agricultural machinery and, more particularly, to an assembly for providing support for an agricultural implement on an agricultural machine.

DESCRIPTION OF THE RELATED ART

German Patent No. 199 18 551 discloses a generic agricultural harvesting machine which is designed as a forage harvester and which at the front has an intermediate attachment which receives an agricultural implement. In order that the load of the agricultural implement does not have to be supported exclusively via the axle of the machine, which is at the front in the direction of travel, in at least one embodiment associated with the intermediate attachment are support wheels which make it possible for at least part of the mass of the agricultural implement to be supported via these support wheels on the ground during road transport. This has firstly the advantage that during road travel the front axle of the machine does not have to support the whole load of the adapted agricultural implement. Adaptation of the support wheels to the intermediate attachment of the agricultural machine does however require considerable reinforcement of this intermediate attachment, because when travelling over uneven terrain considerable shock loads can arise and have to be absorbed by the intermediate attachment. Also the support wheels, which at best are designed as castor wheels, are not capable of assisting the steering movement of the agricultural machine, because they perform a pivot movement about their approximately vertical trailing axis only as a function of the reaction forces applied to them, and these reaction forces depend critically on the nature of the ground over which the machine is moving.

The present invention is directed to overcoming one or more of the problems set forth above.

SUMMARY OF THE INVENTION

An aspect of the present invention is to provide a method and assembly for providing support for an agricultural implement carried on a receiving device of an agricultural machine.

Another aspect of the present invention is to provide a support wheel assembly whereby application of load in conformity with forces and good steerability of the agricultural harvesting machine are ensured.

In accordance with the above aspect of the invention, there is provided a support wheel assembly for an agricultural harvesting machine having a receiving device for an agricultural implement that includes a support frame connected with the agricultural harvesting machine and the receiving device; and at least one support wheel connected with the support frame. In a preferred embodiment, the support frame includes first and second supporting arms. The second supporting arm is oriented in a generally vertical direction and is variable in length. In a particularly advantageous embodiment, the second support is a lifting cylinder or a telescopic arm and is provided with a damping element. By the fact that the at least one support wheel is received by a support frame which is operatively connected to both the agricultural harvesting machine and the receiving device, it is ensured that the loads applied to the at least one support wheel are transmitted to the ground in conformity with forces, so that structurally elaborate and therefore expensive reinforcements in the region of the at least one support wheel on the receiving device can be dispensed with.

In another embodiment, the support wheel assembly includes at least one steerable support wheel that is pivoted on a pivot shaft by a steering cylinder. A preferred embodiment includes first and second steerable support wheels connected by a coupling mechanism and pivoted about first and second pivot shafts by a common steering cylinder. In yet another advantageous embodiment, the common steering cylinder is operatively coordinated with a steered axle of the agricultural harvesting machine through a control unit.

These aspects are merely illustrative of the innumerable aspects associated with the present invention and should not be deemed as limiting in any manner. These and other aspects, features and advantages of the present invention will become apparent from the following detailed description when taken in conjunction with the referenced drawings.

BRIEF DESCRIPTION OF THE DRAWINGS

Reference is now made more particularly to the drawings which illustrate the best presently known mode of carrying out the invention and wherein similar reference characters indicate the same parts throughout the views.

FIG. 4 is a schematic of an agricultural harvesting machine incorporating an embodiment of a support wheel assembly including a control system according to the present invention.

DETAILED DESCRIPTION

Figure 1:
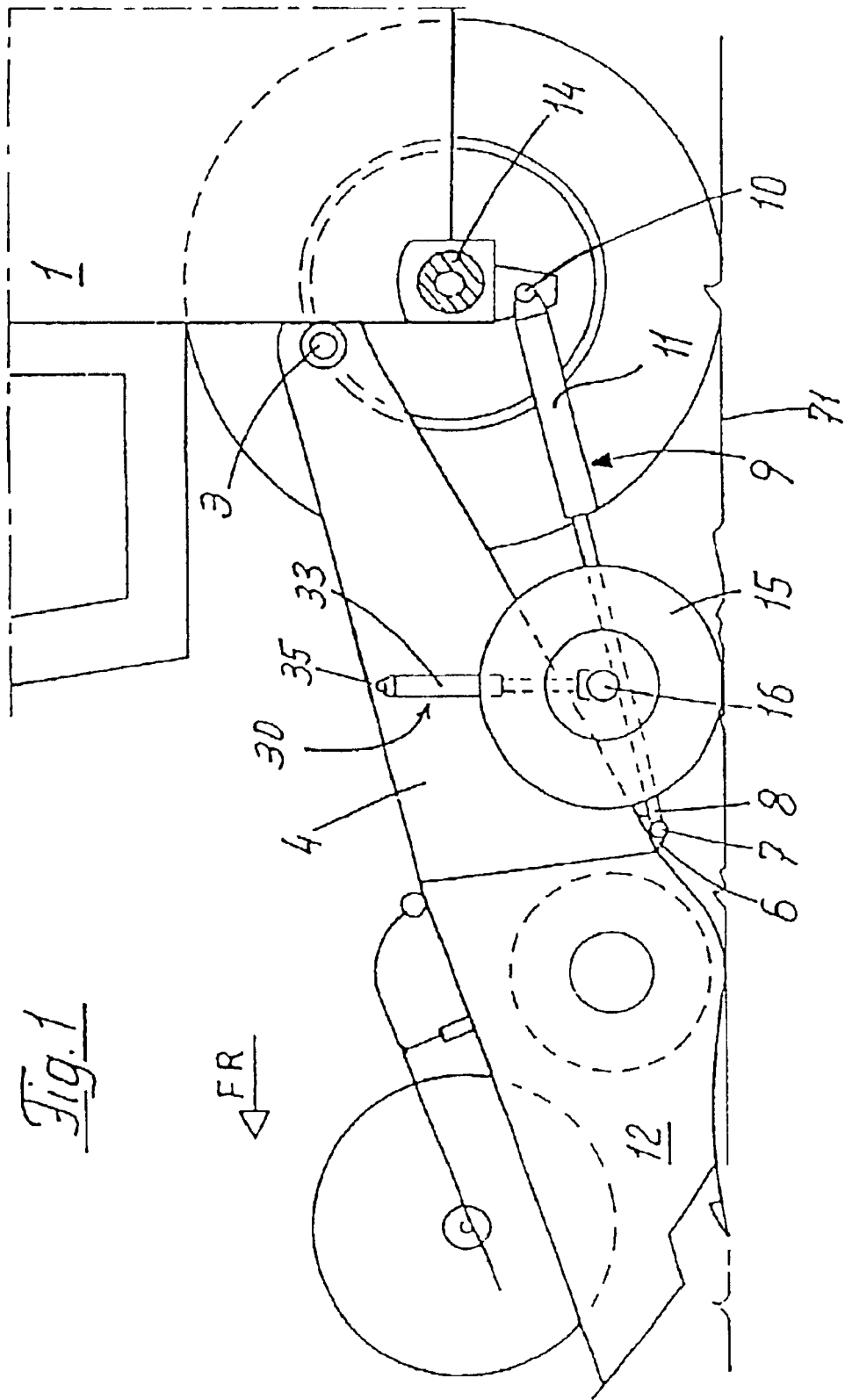
FIG. 1 is a side view of an agricultural harvesting machine incorporating an embodiment of a support wheel assembly according to the present invention.

In FIG. 1 is shown an agricultural harvesting machine 1 shown as a combine harvester, which in its front region receives a pivot shaft 3 which is transverse to a direction of travel FR and which receives a receiving device 4, such as a feed rake, so that it is pivotable in a vertical direction. On the lower side, formed integrally with the receiving device 4 are holding flanges 6 which at one end receive the front ends of the piston rods 8 of lifting cylinders 9 so that they are pivotable about an axis 7 extending transverse to the direction of travel FR. The lifting cylinders 9 are arranged on the agricultural harvesting machine 1 so that they are pivotable about transverse axes 10. By pressurizing lifting cylinders 9 or relieving them of pressure, the piston rods 8 extend out of the cylinders 11 or retract, so that the receiving device 4 performs a pivot movement in a vertical direction about the shaft 3 arranged on the machine 1. Apart from pivoting the receiving device 4, the lifting cylinders 9 also serve to support the receiving device 4 on the machine 1. At the front, associated with the receiving device 4 in a manner known in the art and therefore not described in more detail is an agricultural implement shown as a grain header 12.

Figure 2:
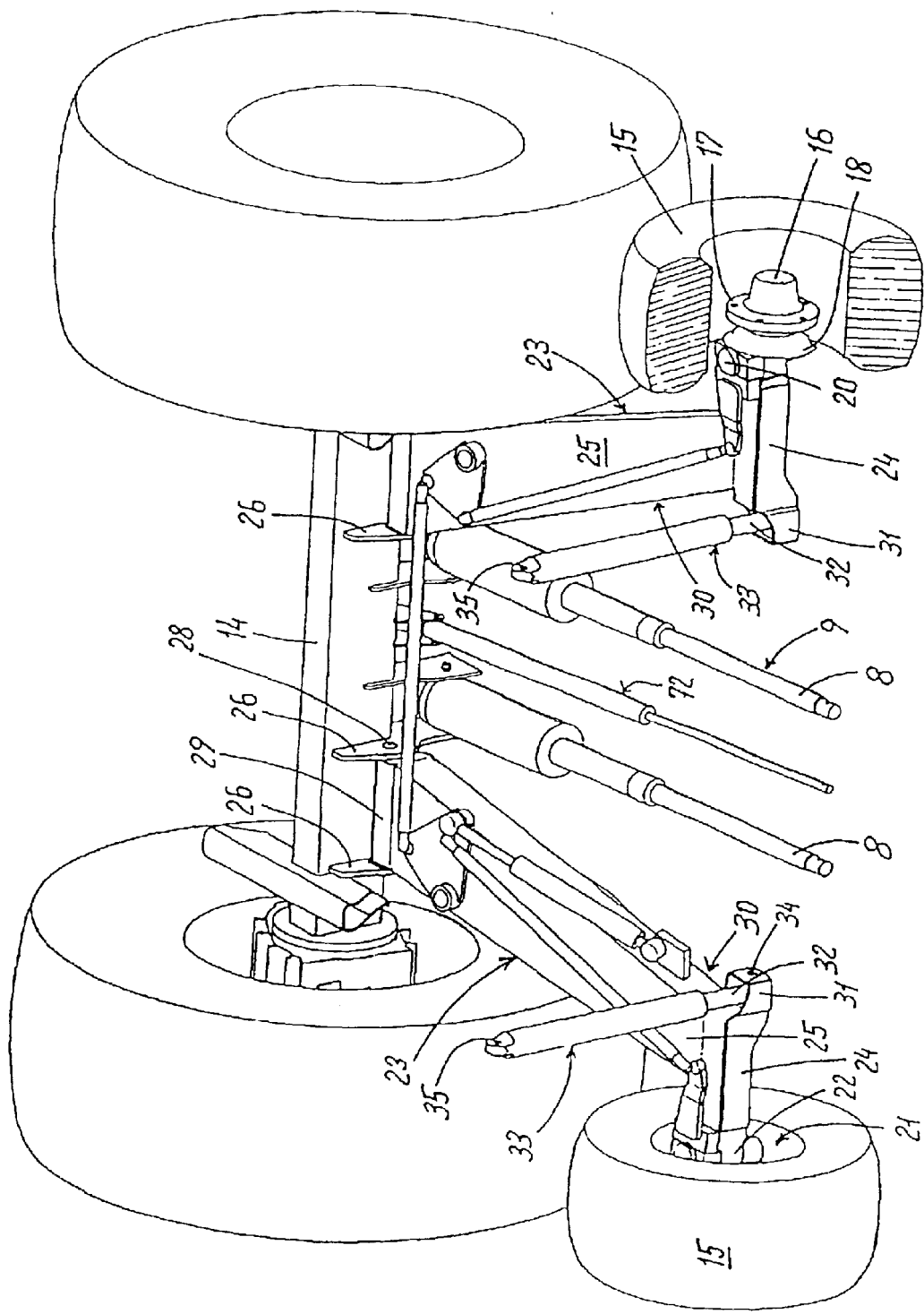
FIG. 2 is a perspective view of an embodiment of a support wheel assembly according to the present invention.

So that the load of the receiving device 4 and of the associated agricultural implement 12 is not carried solely by the lifting cylinders 9, support wheels 15 are provided on both sides. The support wheels are located on the receiving device 4 in the region between the grain header 12 and the front axle 14 of the machine 1. As best shown in FIG. 2, a wheel axle 16 of each support wheel 15 is surrounded by a hub 17 which is integrally formed with a receiving flange 18. A pivot shaft 20 passes through the receiving flange 18 in a generally vertical direction and, at its simplest, is designed as an axially locked bolt. As shown at the left of FIG. 2, in a rim region 21 of the support wheels 15, the vertical pivot shaft 20 also passes through a guide eye 22 which is attached to a first supporting arm 23 according to a preferred embodiment. Thus, associated with each support wheel 15 is the first supporting arm 23. At the end receiving the respective support wheel 15, each supporting arm 23 has a head piece 24 of any convenient shape. An angle profile carrier 25 is welded to the head piece 24 on its machine side. The angle profile carrier 25 has a cross-section increasing in the direction towards the front axle 14. On the front side of the front axle 14 are associated holding flanges 26 through which pass shafts 28. At their simplest shafts 28 are designed as axially locked bolts extending transverse to the direction of travel FR. The gap between adjacent holding flanges 26 is traversed by flange-like extensions 29 of the angle profile carriers 25. Construction is such that the respective shaft 28 receives the associated angle profile carrier 25 so that it is pivotable in a vertical direction. In this way the first supporting arm 23 of a support frame 30 is pivotably connected to the agricultural harvesting machine 1 in the region of its front axle 14.

As shown in FIG. 2, a holder 31 is formed integrally with the head piece 24 on the side facing away from the respective support wheel 15. The respective holder 31 receives a front end of a piston rod 32 of a lifting cylinder 33 so that it is pivotable about a transverse axis 34. The cylinder end of the lifting cylinder 33 is attached to the receiving device 4 of the agricultural harvesting machine 1 so that it is pivotable about a transverse shaft 35. Thus the respective lifting cylinder 33 forms a second supporting arm of the support frame 30 according to the preferred embodiment. This further supporting arm connects the support wheel 15 to the receiving device 4 as best shown in FIG. 1. In this way, each of the support wheels 15 is connected by the support frame 30 (including first supporting arm 23) and the further supporting arm to both the agricultural harvesting machine 1 and the receiving device 4. It is contemplated that the support frame 30, which is constructed in two pieces in the practical example, may be constructed in one piece. Further the support frame 30 may be arranged on the agricultural harvesting machine 1 so that it is pivotable via one or more pivot axes, such as the shafts 28. It is also contemplated that the receiving device 4 be supported on the agricultural harvesting machine 1 via only one lifting cylinder 9 or any number of lifting cylinders 9.

A particularly advantageous embodiment is achieved when the first supporting arm or arms 23 connect the support wheels 15 to the agricultural harvesting machine 1 in an essentially horizontal direction; while the second supporting arms 33 connect the support wheels 15 to the receiving device 4 in an essentially vertical direction. This arrangement ensures that the reaction forces applied to the respective support wheel 15 cause only low moments in the associated support frame, particularly when the support wheel encounters an obstacle. By designing the second supporting arms as lifting cylinders 33, it is also ensured that the association of the support wheels 15 with the receiving device 4 can be varied in a vertical direction. This way the support wheels 15 can be arranged to always touch the ground 71 irrespective of the position of the receiving device 4. This ensures relief of the load on the machine's axles.

Figure 3:
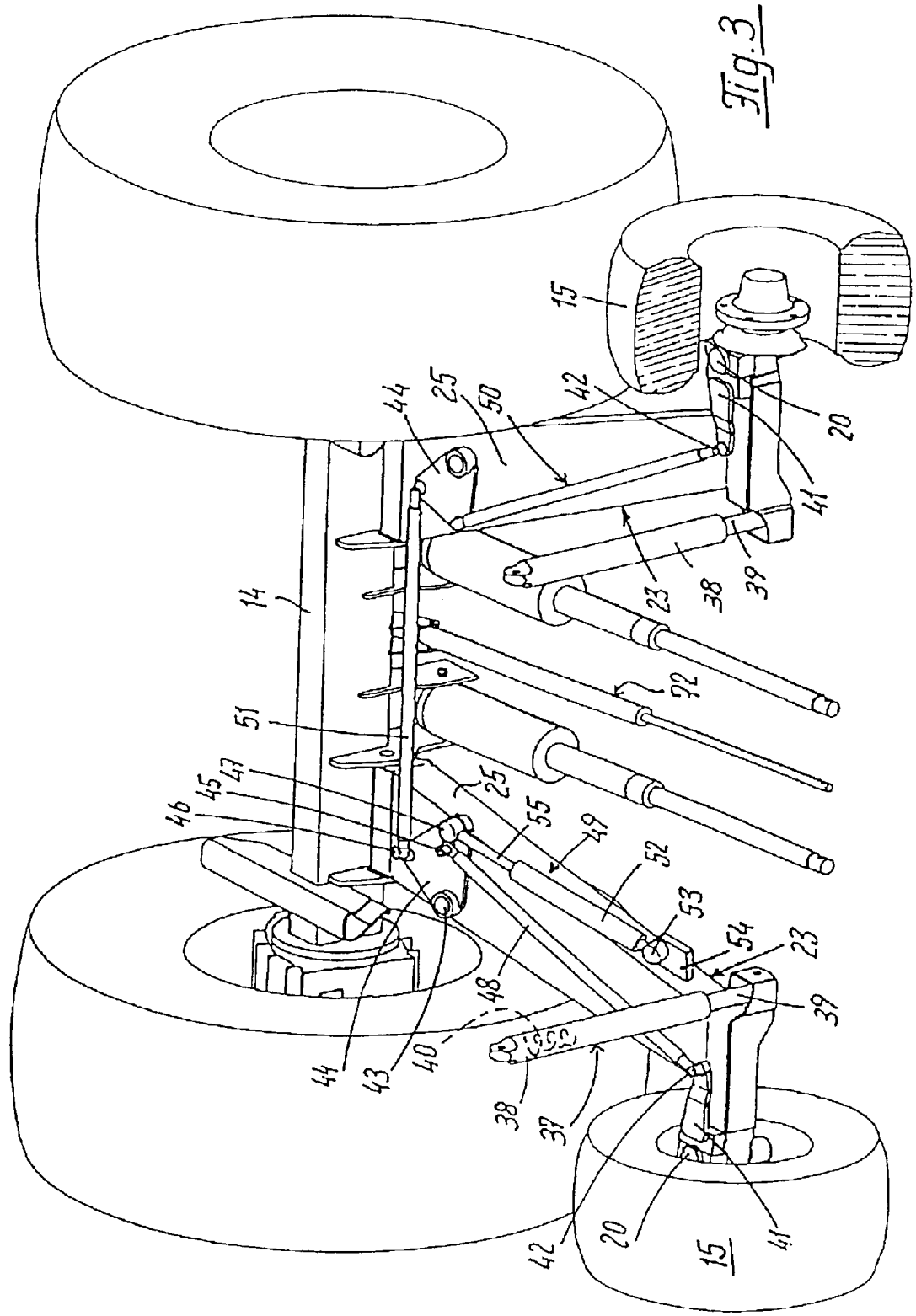
FIG. 3 is a perspective view of another embodiment of a support wheel assembly according to the present invention.

The second supporting arm, which in the practical example is designed as a lifting cylinder 33, may be constructed as a telescopic arm 37 illustrated in FIG. 3. The movement of the relatively slidable profiles 38, 39 of the telescopic arm 37 is conveniently damped by a compression spring 40. Such a compression spring 40 can also be integrated in the lifting cylinder 33 in a manner known in the art. The damping element reduces wear on the supporting arms and other elements of the support frame.

In a particularly advantageous embodiment shown in FIG. 3, the support wheels 15 are steerable. For this purpose, each bolt forming the vertical pivot axis 20 of the support wheels 15 is encompassed at the top by a steering lever 41 with which is associated at one end a vertically-extending stud 42. The supporting arm 23 which receives the respective support wheel 15 has (at its end associated with the front axle 14) a vertically-extending stud 43. On each stud 43 is pivotably arranged an angle lever 44. Each angle lever 44 has an associated plurality of studs 45, 46, 47 which are conveniently non-rotatable. A first coupling rod 48 connects the stud 42 of the steering lever 41 pivotably to stud 45 arranged on the angle lever 44. The coupling rod 48 extends from adjacent the front axle 14 to adjacent a respective support wheel. Coupling rod 48 is located above and in the region of the angle profile carrier 25 of the respective supporting arm 23. In the embodiment shown in FIG. 3, each support wheel 15 has an associated steering lever 41, coupling rod 48 and angle lever 44. These are arranged inversely symmetrically to each other for the opposite support wheel 15, and which in each case form a partial steering mechanism 49 or 50. In the region of the front axle 14, the two partial steering mechanisms 49, 50 are coupled to each other by a connecting strut 51 pivotably connected to the rear studs 46 of the angle levers 44. Pivotably associated with one of the angle levers 44 via stud 47 is a steering cylinder 52 which at the other end is received by a holding flange 54 attached to the angle profile carrier 25 and pivotable about a vertical axis 53. By selectively pressurizing the double-acting steering cylinder 52, the piston rod 55 can be moved in or out of the steering cylinder 52, so that the support wheels 15 are moved about their vertical pivot axes 20. The described arrangement of the steering mechanisms along the supporting arms is particularly advantageous because it helps prevents damage to the steering mechanisms, which are located close to the ground.

It is contemplated only one support wheel 15 may be steerable or a plurality of support wheels 15 may be steerable. If there is more than one support wheel 15, only some of the support wheels 15 may be steerable.

In an advantageous arrangement shown in FIG. 4, the steering movement of steering wheels 58 on an axle 57 of the agricultural harvesting machine 1 is coordinated with or coupled with the steering movement of the support wheels 15. This can be achieved by an angle-of-rotation sensor 60 associated with a steering wheel 59 in an operator's compartment of the machine 1. The angle-of-rotation sensor 60 has an output signal which is fed to an electronic control unit 61 which generates an output signal for adjustment of a directional control valve 62 (of a type known in the art) as a function of the position of the steering wheel 59. On the output side, associated with the directional control valve 62 are conduit systems 63, 64 which in each case connect pressure chambers 65, 66 of steering cylinders 52, 69 on the piston face side or the pressure chambers 67, 68 on the piston rod side to each other. These are arranged so that the steering wheels 58 and the support wheels 15 are steered simultaneously. Because of the design of the steering mechanism 49, 50, 51, the steering wheels 58 and the support wheels 15 are moved in opposite directions, so that the support wheels 15 assist the steering movement of the agricultural machine 1. Particularly good assistance of the steering movement of the machine 1 is achieved if the steering angle α of the support wheels 15 corresponds to the inverted value of the steering angle β of the land wheels 58 of the steered axle 57 of the agricultural harvesting machine. By arranging at least one support wheel 15 as a steered support wheel, the handling of the machine around turns is improved, resulting in improved maneuverability and a smaller turning radius.

In an advantageous arrangement, associated with at least one of the steering wheels 58 of the steered axle 57 of the agricultural harvesting machine 1 can be a wheel angle sensor 70 which generates an output signal processable in the electronic control unit 61 and dependent on the steering angle β of the steering wheel 58. The electronic control unit 61 in turn generates an output signal which directly controls the at least one steerable support wheel 15 and leads to the deflection of this at least one steerable support wheel 15 by the steering angle α. This arrangement provides automatic adjustment of the steerable support wheel 15.

It is advantageous to ensure that the support wheels 15 support a minimum load on the ground 71, even when there is no agricultural implement 12. On the one hand the lifting cylinders 9 which pivot the receiving device 4 can be designed as double-acting lifting cylinders 9, so that by means of the piston rod 8 retracting into the cylinder 11 of the lifting cylinders 9 it can be fixed how high the load to be supported on the ground 71 by the support wheels 15 is to be. If the lifting cylinders 9 which pivot the receiving device 4 are single-acting, between the receiving device 4 and the agricultural harvesting machine 1 can be interposed a traction cylinder 72 (see FIG. 3) which under pressurization forces the support wheels 15 onto the ground 71. In this manner, by pressurization of the traction cylinder 72 the quantity of the load to be supported can be determined and/or controlled.

In another embodiment, the support frame and support wheels are removeably connected with the agricultural machine to allow operation of the machine without the support wheels.

It is contemplated that the steerable support wheels 15 can also be designed to be actively drivable thereby assisting the movement of the agricultural machine.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

What is claimed is:

1. An agricultural harvesting machine having a receiving device, including:
   means for mounting the receiving device on the machine for pivotal movement about a transverse axis;
   at least one lifting cylinder for lifting the receiving device, the lifting cylinder having a first end operatively connected to the receiving device and a second end operatively connected to the machine;
   a non-extendable first supporting arm pivotably connected to the machine;
   support wheels for supporting the receiving device mounted on the first supporting arm;
   an extendable second supporting arm pivotably connected to the receiving device and to the first supporting arm for selectively varying the position of the support wheels relative to the receiving device; and
   further including a damping element associated with the second supporting arm wherein variations in length of the second supporting arm means are damped.

2. An agricultural harvesting machine according to claim 1, wherein the damping element is a compression spring.

3. The agricultural harvesting machine according to the claim 1, wherein the first supporting arm comprises a support frame, and the support wheel and the support frame are removably connected with the agricultural harvesting machine.

4. The agricultural harvesting machine according to claim 1, further including means operatively connected to the agricultural harvesting machine and the extendable second supporting arm for urging the support wheels downwardly.

5. A support wheel assembly for an agricultural harvesting machine having a receiving device for receiving an attachment; steerable rear wheels; and non-steerable front wheels the assembly including:
   a support frame having first and second arms pivotably connected to the agricultural harvesting machine;
   a pair of steerable support wheels for supporting the attachment associated with the attachment and operatively connected to the support frame, each one of the pair of steerable support wheels being mounted on one of the first and second arms;
   an extendable supporting arm extending between the receiving device and the support frame for selectively urging the support wheels into engagement with the ground; and
   steering device controllably steering the support wheels in coordination with steering of the rear wheels of the machine.

6. A support wheel assembly according to claim 5, further including:
   a first pivot shaft associated with one of the pair of the steerable support wheels and a second pivot shaft associated with another one of the pair of the steerable support wheels, said steerable support wheels each being pivotable about its respective pivot shaft and said first and second pivot shafts being oriented in a generally vertical direction; and a coupling mechanism interconnecting the steerable support wheels; and
   wherein the steering device includes a common steering cylinder that pivots the steerable support wheels.

7. A support wheel assembly according to claim 6, wherein the coupling mechanism includes a connecting strut, and including a first partial steering mechanism and a second partial steering mechanism, said first and second partial steering mechanisms being connected with one another by the connecting strut, and said first and second partial steering mechanisms being associated with the first and second arms respectively.

8. A support wheel assembly according to claim 7, wherein the first and second partial steering mechanisms each include:
   an angle lever arranged on the respective arm and rotatable about a generally vertical axis;
   a steering lever connected with the pivot shaft associated with the respective steerable support wheel;
   a coupling rod connected with the angle lever and the steering lever; wherein the angle levers of the first and second partial steering mechanisms are connected with one another by the connecting strut; and wherein the common steering cylinder engages at least one of the angle levers.

9. A support wheel assembly for an agricultural harvesting machine having a receiving device for receiving an attachment, and steerable rear wheels, the assembly including:
- a first support frame having first and second supporting arms, the first supporting arm operatively connected to the agricultural harvesting machine and the second supporting arm operatively connected to the receiving device;
- a first steerable support wheel for supporting the attachment associated with the attachment and operatively connected to the first support frame;
- a steering mechanism controllably steering the first support wheel in coordination with steering of the rear wheels of the machine;
- a second support frame having third and fourth supporting arms, the third supporting arm operatively connected to the agricultural harvesting machine and the fourth supporting arm operatively connected to the receiving device;
- at least a second steerable support wheel associated with the attachment, the second steerable support wheel operatively connected to the second support frame and the steering mechanism;
- at least one steered axle associated with the agricultural harvesting machine and wherein a steering movement of the first and second steerable support wheels is coupled with a steering movement of the steered axle; and
- wherein the steering mechanism includes an axle steering cylinder associated with the steered axle and a support wheel steering cylinder associated with at least one of the steerable support wheels and wherein the axle and support wheel steering cylinders are operatively coordinated.

10. A support wheel assembly according to claim 9, further including:
- a wheel angle sensor associated with one of the steerable rear wheels which generates a wheel angle signal as a function of a land wheel steering angle;
- a control unit in communication with the wheel angle sensor and the support wheel steering cylinder and which receives the wheel angle signal, generates a steering angle signal as a function of the wheel angle signal, and transmits the steering angle signal to the support wheel steering cylinder; and wherein the support wheel steering cylinder adjusts a support wheel steering angle as a function of the steering angle signal.

11. A support wheel assembly according to claim 10, wherein the control unit generates a steering angle signal as an inverse function of the wheel angle signal.

12. A support wheel assembly according to claim 9, further including:
- an angle-of-rotation sensor associated with a steering wheel of the agricultural harvesting machine which generates an first output signal;
- a control unit in communication with the angle-of-rotation sensor which receives the first output signal and generates a second output signal as a function of the first output signal;
- a directional control valve in communication with the control unit and the axle and support wheel steering cylinders and which receives the second output signal and wherein the directional control valve adjusts the axle and support wheel steering cylinders as a function of the second output signal; and wherein the support wheel steering cylinder adjusts a support wheel steering angle and the axle steering cylinder adjusts an axle steering angle.

13. A support wheel assembly for an attachment on an agricultural harvesting machine, including
- first and second steerable support wheels associated with and supporting the attachment;
- a first supporting arm associated with the first steerable support wheel;
- a second supporting arm associated with the second steerable support wheel;
- a variable length third support arm associated with the first steerable support wheel;
- a variable length fourth support arm associated with the second steerable support wheel;
- a coupling mechanism connecting the first steerable support wheel with the second steerable support wheel, the coupling mechanism including a connecting strut;
- first and second partial steering mechanisms associated with the first and second supporting arms respectively, the first and second partial steering mechanisms being connected with one another by the connecting strut;
- a first pivot shaft associated with the first steerable support wheel and a second pivot shaft associated with the second steerable support wheel, said first and second steerable support wheels each being pivotable about its respective pivot shaft and said first and second pivot shafts being oriented in a generally vertical direction; and
- a steering apparatus controllably steering the support wheels, the steering apparatus including a common steering cylinder that pivots the first and second steerable support wheels.

14. A support wheel assembly according to claim 13, wherein the first and second partial steering mechanisms each include:
- an angle lever arranged on the respective supporting arm and rotatable about a generally vertical axis;
- a steering lever connected with the pivot shaft associated with the respective steerable support wheel;
- a coupling rod connected with the angle lever and the steering lever;
- wherein the angle levers of the first and second partial steering mechanisms are connected with one another by the connecting strut; and wherein the common steering cylinder engages at least one of the angle levers.

15. A support wheel assembly for an attachment on an agricultural harvesting machine, including a first support wheel associated with and supporting the attachment, a steering mechanism controllably steering the support wheel, at least one steered axle associated with the agricultural harvesting machine, wherein a steering movement of the first steerable support wheel is coupled with a steering movement of the steered axle, wherein the steering mechanism includes an axle steering cylinder associated with the steered axle and a support wheel steering cylinder associated with the steerable support wheel, and wherein the axle and support wheel steering cylinders are operatively coordinated.

16. A support wheel assembly for a harvesting machine having a crop receiving device mounted thereon by a transverse pivot and having independent lift cylinders operatively connected to the harvester and to the crop receiving device such that the crop receiving device may be vertically raised or lowered, the support wheel assembly comprising:

at least one wheel disposed generally between the harvesting machine and a front of the crop receiving device, said at least one wheel turning about an axis transverse to the direction of travel of the harvesting machine;

at least one rigid support arm having a rear portion and a forward portion, said rear portion being pivotably attached to the harvesting machine and said forward portion having a head piece fixedly attached thereto, said head piece being intersected by said transverse axis; and at least one support cylinder having a lower pivot and an upper pivot, said lower pivot being on said head piece and said lower pivot being substantially coaxial with said transverse axis, and said upper pivot being mounted on the crop receiving device such that said supporting cylinder maintains a load support of said crop receiving device by said at least one support wheel.

* * * * *